G. H. STANLEY.
CLASSIFYING OR GRADING APPARATUS.
APPLICATION FILED SEPT. 30, 1911.
1,039,206.
Patented Sept. 24, 1912.
2 SHEETS—SHEET 1.
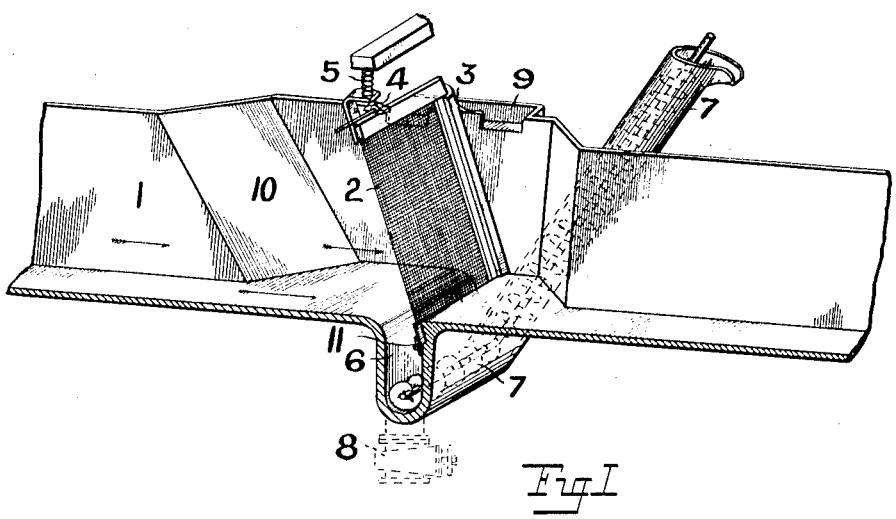
Fig. I
Witnesses:
A. H. Smith
K. O'Hara
Inventor:
George Hardy Stanley
per
Lawrence Langner
Attorney.

G. H. STANLEY.
CLASSIFYING OR GRADING APPARATUS.
APPLICATION FILED SEPT. 30, 1911.
1,039,206.
Patented Sept. 24, 1912.
2 SHEETS—SHEET 2.
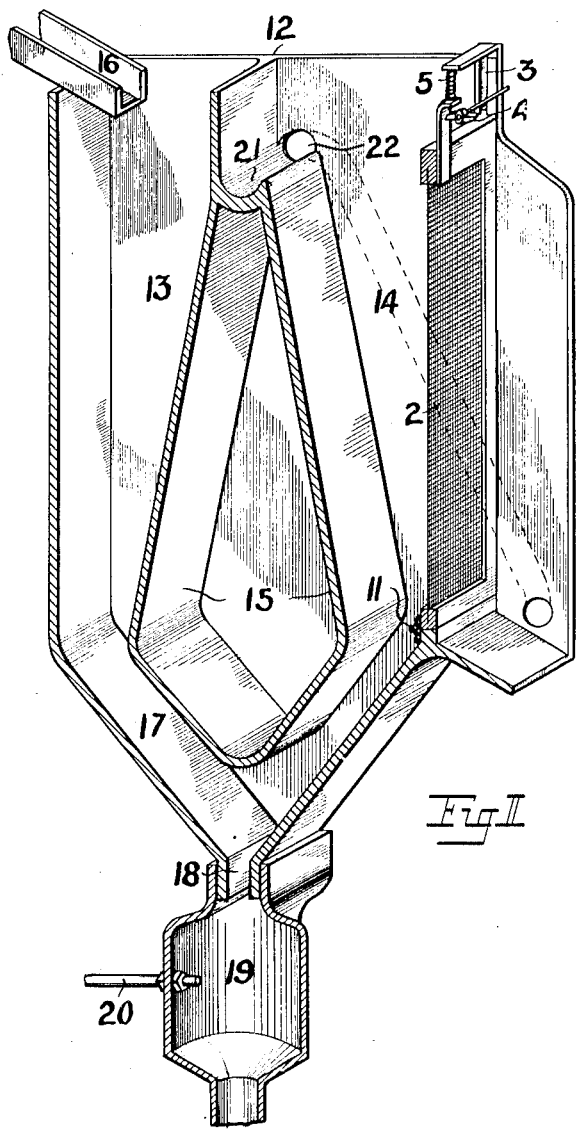
Fig. I
Witnesses:
J. N. Smith
K. O'Hara
Inventor:
George Hardy Stanley,
per
Lawrence Langner.
Attorney.

UNITED STATES PATENT OFFICE.

GEORGE HARDY STANLEY, OF JOHANNESBURG, TRANSVAAL, ASSIGNOR TO SANDS LIMITED, OF JOHANNESBURG, TRANSVAAL.

CLASSIFYING OR GRADING APPARATUS.

1,039,206.  Specification of Letters Patent.  Patented Sept. 24, 1912.

Application filed September 30, 1911. Serial No. 652,209.

*To all whom it may concern:*

Be it known that I, GEORGE HARDY STANLEY, a British subject, residing at the South African School of Mines and Technology, Johannesburg, Transvaal, have invented new and useful Improvements in Classifying or Grading Apparatus, of which the following is a specification.

In the art of classifying or separating crushed ore and other materials, the use of sieves or screens produces results of a high degree of perfection as compared with other methods. The application of screens to the classification or separation of the finer classes of material has nevertheless been very considerably restricted hitherto owing to their relatively low output and constant tendency to choke.

In screening operations hitherto known, the material has been fed onto the screen from above and has passed through the same by gravity, assisted frequently by water sprays, vibration or brushing of the screen, and the like. In all such cases not only, on the one hand, is the gravitational movement of the finer material through the screen hindered and rendered sluggish by the clinging tendency of said material, but on the other hand the oversize is necessarily retained on the upper surface of the screen for a relatively long period, *i. e.* while traveling from the point at which it is fed to the point of discharge from the screen, during the whole of which period it covers up and renders inoperative a comparatively large proportion of the screen apertures.

The present invention provides a screening device which is capable of treating large quantities of material and has little tendency to choke.

According to this invention, the material is fed to and through the screen solely by means of a continuous stream of liquid in contra-distinction to the present gravitational method, while the screen is so disposed that the oversize tends to fall directly away from it by gravity. Thus, the screen is usually set vertically or is inclined upwardly toward the oncoming material. Furthermore the screen is rapidly reciprocated in its own plane in such a manner that it is bumped at each reciprocation. In the case of a vertical screen it is reciprocated vertically and bumped on the down stroke; and similarly in the case of an inclined screen. The surface of the screen may be flat, curved, corrugated or of other form. Suitable provision is made when necessary, for collecting and withdrawing the oversize rejected by the screen, and various arrangements may be provided for this purpose as hereafter described.

The accompanying drawings are illustrative of different ways of carrying out the invention.

Figure I is a perspective view of a launder down which the pulp is passed as indicated by the arrows. In the launder 1 a screen 2 is fitted to slide in a housing 3, and is reciprocated endwise by such means as the lifting tappet 4 and the spring 5 tending to force it downward. The reciprocations should be rapid but need be of but small amplitude. The effect of tappet 4 and spring 5 is to cause the screen to be bumped at the end of each small downward movement. All particles which are too large to pass the screen but which are held against the same by the flow of the liquid are thereby detached from the screen and projected downward. They may fall away completely clear of the screen; or if they are carried again into contact with it they are at once detached again and thrown farther toward the bottom of the screen. As the shocks follow each other in rapid succession the screen is thus kept almost constantly free from particles resting against its surface and its capacity is maintained at a very high value. The screen is inclined toward the oncoming pulp, so that the larger particles of the pulp which are stopped by it fall into the pocket 6; from which they may be removed by the conveyer 7 or by means of a valve 8. 9 is an elevated spillway or bypass whereby, in the event of the screen becoming choked by large floating material such as bits of wood, cinders and the like, the pulp will flow around the screen, carrying the floating material with it and so causing the screen to be cleared. The wall 10 of the launder above and near to the screen may advantageously be sloped outward as shown, so that when the level of the pulp rises in the launder the surface velocity will be diminished and coarse material will not be carried around the by-pass. For preventing pulp from entering between the screen frame and the housing, the joint may be covered with a pliable strip of fabric or rubber 11; or clear water may be injected into the joint in the well known manner.

Fig. II shows the invention applied to a hydraulic classifier. The casing 12 is divided into two compartments 13 and 14 by a partition 15. 16 is a launder for the supply of pulp. The bottom of the casing is curved or sloped as shown and the bottom of the partition is correspondingly shaped to form therewith a constricted passage 17 through which pulp will pass rapidly and in a regular stream from compartment 13 to compartment 14. In order to obtain the best results compartment 14 should increase considerably in area toward the top. In the course of passage 17 there is formed a slot 18 or other opening leading to a collecting chamber 19 or a pipe for the larger or heavier material, whence said material is discharged by means of a siphon or other known device. 20 is a pipe for supplying hydraulic water in the known manner. The reciprocating screen 2 forms part of one side of the compartment 14 and may conveniently be set substantially vertically as shown. 21 is a trough at about the level of the top of the screen and 22 an outlet forming therewith a spillway or by-pass for passing surplus pulp from compartment 14 independently of the screen.

In the operation of this device, the pulp in passing through passage 17 and compartment 14 is subjected to hydraulic classification according to well known principles, whereby a greater or less amount of the heavier and/or larger particles tends to settle and pass off through the slot 18, while the smaller and/or lighter particles continue with the stream and pass away through the screen 2. Such large particles as are not separated hydraulically are stopped by the screen and fall back to the slot 18.

It will be apparent from the foregoing that the screen itself according to this invention possesses two essential attributes neither of which is of value without the other. Were the screen positioned otherwise than so that the oversize could fall directly from it, the reciprocation with shock would in itself be useless to keep the screen apertures clear. On the contrary since the oversize particles would be held by gravity in contact with the face of the screen the effect of such reciprocation would rather be detrimental owing to its tendency to assist gravity in causing irregular particles slightly larger than the screen apertures to settle and wedge into said apertures. Again merely positioning the screen as specified without reciprocating and bumping it would result in the current holding large numbers of oversize particles against the screen and so blinding the same to a very large extent. When however both the features specified are present, the bumping reciprocation detaches oversize particles from the screen practically at the instant that they make contact therewith, whereupon owing to the position of the screen they are free to respond to the action of gravity and to be carried thereby ultimately clear of the screen.

What I claim and desire to secure by Letters Patent is:—

1. The combination of a screen disposed at an angle to the vertical so that oversize material will fall directly therefrom by gravity, said screen being movable in its own plane, mechanism for reciprocating the screen in said plane with small amplitude, rapidly and with shock, means inclosing the feed side of the screen to form with said screen a chamber adapted to contain pulp, means for passing pulp continuously into said chamber, and means below the screen and in connection with said chamber adapted to receive oversize material rejected by the screen and to prevent return thereof to the screen.

2. The combination of a substantially vertical screen, mechanism for rapidly reciprocating said screen up and down in its own plane and causing the same to be bumped at the end of each downward movement, and means for feeding a continuous stream of pulp to said screen.

In testimony whereof I have signed my name to this specification in the presence of two subscribing witnesses.

GEORGE HARDY STANLEY.

Witnesses:
C. B. HENDERSON,
B. PULLIN.